United States Patent [19]

Kohlndorfer

[11] Patent Number: 5,507,449
[45] Date of Patent: Apr. 16, 1996

[54] SEAT BELT RETRACTOR WITH NOISE SUPPRESSION

[75] Inventor: Kenneth H. Kohlndorfer, Roseville, Mich.

[73] Assignee: TRW Vehicle Safety Systems Inc., Lyndhurst, Ohio

[21] Appl. No.: 289,938

[22] Filed: Aug. 12, 1994

[51] Int. Cl.⁶ ................................................. B60R 22/40
[52] U.S. Cl. ............................... 242/384.1; 242/384.2
[58] Field of Search .................................. 242/384.1, 384.2, 242/383.1; 280/806; 297/478, 480

[56] References Cited

U.S. PATENT DOCUMENTS

| | | | |
|---|---|---|---|
| 4,220,294 | 9/1980 | DiPaola | 242/384.1 |
| 4,509,706 | 4/1985 | Thomas . | |
| 4,607,805 | 8/1986 | Burghardt et al. . | |
| 4,632,331 | 12/1986 | Bracnik et al. . | |
| 4,703,950 | 11/1987 | Pickett | 242/384.1 X |
| 4,749,142 | 7/1988 | Saitow . | |
| 4,993,656 | 2/1991 | Tsuge et al. . | |
| 5,002,601 | 6/1991 | Saitou et al. . | |
| 5,232,176 | 8/1993 | Doty . | |
| 5,261,624 | 11/1993 | Thomas . | |
| 5,301,893 | 4/1994 | Doty et al. . | |

*Primary Examiner*—John M. Jillions
*Attorney, Agent, or Firm*—Tarolli, Sundheim, Covell, Tummino & Szabo

[57] ABSTRACT

A seat belt retractor (14) includes a spool (16) supported for winding and unwinding rotation, and an emergency locking mechanism (60) which, when actuated, blocks unwinding rotation of the spool (16). The emergency locking mechanism (60) is actuated upon movement of a locking member (72) from a first position to a second position. A collision indicator (74) applies a predetermined force to the locking member (72) to move the locking member (72) toward the second position in response to a predetermined condition indicative of a vehicle collision. A movable spring (100) has a blocking position in which it suppresses noise by resisting movement of the locking member (72) toward the second position. The spring (100) is movable into and out of the blocking position in response to rotation of the spool (16). As a fail-safe feature, the spring (100) is deflectable under the influence of the predetermined force, and thus permits the collision indicator (74) to move the locking member (72) toward the second position in response to the predetermined condition when the spring (100) is in the blocking position.

15 Claims, 5 Drawing Sheets

SEAT BELT RETRACTOR WITH NOISE SUPPRESSION

FIELD OF THE INVENTION

The present invention relates to a seat belt retractor having an emergency locking mechanism, and particularly relates to a device for suppressing noise in such a seat belt retractor.

BACKGROUND OF THE INVENTION

A seat belt system for restraining an occupant of a vehicle ordinarily includes seat belt webbing, a seat belt buckle, and a seat belt retractor. A locking tongue is connected to the webbing and is releasably lockable in the buckle when the webbing is extended around the vehicle occupant. The retractor includes a spool upon which the webbing is wound. The spool rotates in an unwinding direction when the vehicle occupant extracts the webbing from the retractor and moves the webbing toward the extended position in which the tongue is locked in the buckle. When the tongue is subsequently unlocked and released from the buckle, a rewind spring in the retractor rotates the spool in a winding direction to retract the webbing into the retractor.

When the vehicle experiences a collision, the vehicle decelerates and the vehicle occupant wearing the seat belt webbing moves forcefully against the webbing. The force which is then applied to the webbing by the vehicle occupant urges the webbing to move outward from the retractor. However, a seat belt retractor typically includes an emergency locking mechanism which blocks unwinding rotation of the spool in response to sudden vehicle deceleration and/or sudden extracting movement of the webbing. The emergency locking mechanism thus prevents the webbing from moving outward from the retractor when the vehicle experiences a collision. Such an emergency locking mechanism includes a movable collision indicator, such as an inertia weight, and other movable parts that can generate an undesirable rattling noise. Therefore, some seat belt retractors further include a device for suppressing such noise.

SUMMARY OF THE INVENTION

In accordance with the present invention, a seat belt retractor includes a spool and a locking means. The spool is supported for winding and unwinding rotation. The locking means blocks unwinding rotation of the spool when the locking means is actuated. The locking means includes a movable locking member, and is actuated upon movement of the locking member from a first position to a second position.

The locking means further includes collision indicator means for moving the locking member. The collision indicator means applies a predetermined force to the locking member to move the locking member from the first position toward the second position in response to a predetermined vehicle condition which indicates the occurrence a vehicle collision.

The retractor further includes means for suppressing noise. The means for suppressing noise includes a movable spring. The spring has a blocking position in which it suppresses noise by resisting movement of the locking member from the first position toward the second position. The spring is movable into and out of the blocking position in response to rotation of the spool.

Additionally, the spring is deflectable under the influence of the predetermined force. The spring thus permits the collision indicator means to move the locking member from the first position toward the second position in response to the predetermined vehicle condition when the spring is in the blocking position.

In a preferred embodiment of the present invention, the locking member is a pilot pawl. The predetermined vehicle condition comprises a predetermined amount of vehicle deceleration. The collision indicator means comprises an inertia weight which tilts from a rest position to a collision-indicating position in response to the predetermined amount of vehicle deceleration. The inertia weight thus tilts against the pilot pawl to pivot the pilot pawl from the first position to an intermediate position in response to the predetermined amount of vehicle deceleration. A pilot gear further pivots the pilot pawl from the intermediate position to the second position in response to a slight amount of unwinding rotation of the spool which occurs during a vehicle collision.

In the preferred embodiment of the invention, the spring is a wire with a coiled portion and first and second spring arms extending radially from the coiled portion. The spool has a rotatable shaft, and a clutch supports the coiled portion of the spring on the shaft. The clutch thus supports the spring for movement into and out of the blocking position in response to unwinding and winding rotation of the spool, respectively.

When the spring in the preferred embodiment of the invention is in the blocking position, the first spring arm engages the pilot pawl in direct contact with the pilot pawl. The first spring arm then holds the pilot pawl against the inertia weight so as to resist movement of the pilot pawl and the inertia weight under the influence of vibrational or other low level forces. Moreover, an intermediate portion of the first spring arm extends between two opposite end portions of the first spring arm, and transmits the predetermined force from the first end portion to the second end portion during a vehicle collision. The intermediate portion of the first spring arm is perpendicular to the two opposite end portions, and thus defines a moment arm which applies the predetermined force to the second end portion predominantly as a bending force. This promotes bending of the first spring arm under the influence of the predetermined force so that the spring will not block movement of the locking member during a vehicle collision.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
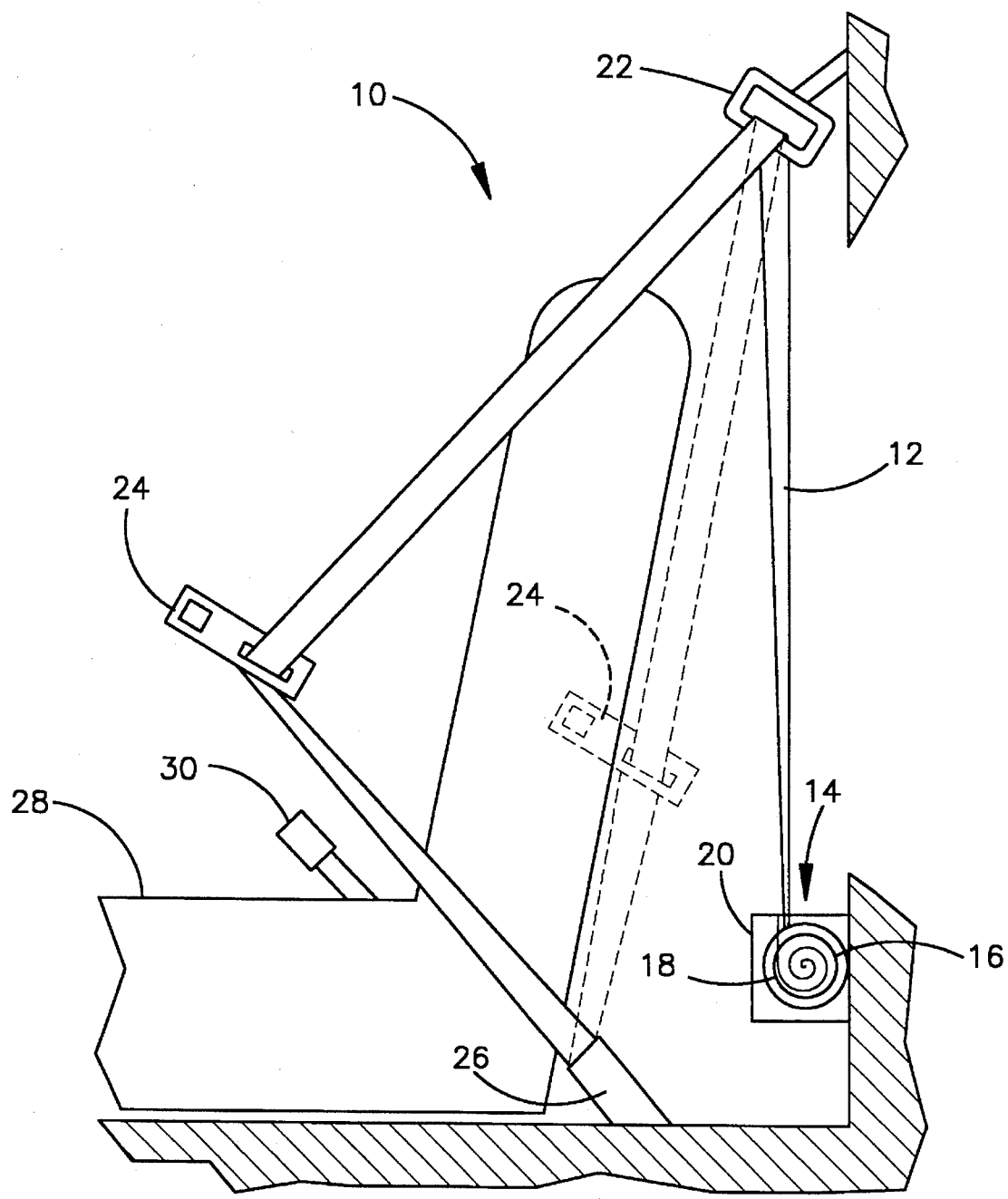
FIG. 1 is a schematic view of a vehicle occupant restraint apparatus comprising a preferred embodiment of the present invention.

A vehicle occupant restraint apparatus 10 comprising a preferred embodiment of the present invention is shown schematically in FIG. 1. The apparatus 10 is a seat belt system including seat belt webbing 12 and a seat belt retractor 14 for the webbing 12. The retractor 14 includes a spool 16 to which the webbing 12 is connected, and includes a rewind spring 18 for the spool 16. The rewind spring 18 acts between the spool 16 and a spring cover 20 so as to bias the spool 16 to rotate in a winding direction. The seat belt system 10 further includes a D-ring 22, a locking tongue 24 and an anchor 26. The webbing 12 extends from the retractor 14 to the anchor 26 through the D-ring 22 and the tongue 24.

The webbing 12 is movable back and forth between a fully retracted position and a fully extracted position upon winding and unwinding of the webbing 12 on the spool 16 in the retractor 14. When the webbing 12 is in the fully retracted position, it is fully wound onto the spool 16, and a portion of the webbing 12 is located on one side of an associated vehicle seat 28, as shown in dashed lines in FIG. 1. When the webbing 12 is in the fully extracted position, it is fully unwound from the spool 16, and is extracted from the retractor 14 sufficiently to enable the tongue 24 to reach a buckle 30 at the other side of the seat 28. The rewind spring 18 is stressed as the spool 16 rotates in an unwinding direction when a vehicle occupant extracts the webbing 12 from the retractor 14 and moves the tongue 24 toward the buckle 30. After the vehicle occupant releases the tongue 24 from the buckle 30, the rewind spring 18 rotates the spool 16 in the winding direction to retract the webbing 12 into the retractor 14, and thereby to move the webbing 12 back to the fully retracted position.

As shown in greater detail in FIGS. 2–5, the retractor 14 includes a frame 40 having first and second opposite side walls 42 and 44. The spool 16 has a central shaft 46 which extends across the frame 40 between the side walls 42 and 44. The shaft 46 is supported by the side walls 42 and 44 for rotation about a longitudinal central axis 48 in the winding direction, which is counterclockwise as viewed in the drawings, and in the unwinding direction, which is clockwise as viewed in the drawings.

A first end portion (not shown) of the shaft 46 projects axially outward from the first side wall 42 of the frame 40. The rewind spring 18 (FIG. 1) is connected between the first end portion of the shaft 46 and the spring cover 20 in a known manner. A second end portion (not shown) of the shaft 46 projects axially outward from the second side wall 44 at the opposite side of the frame 40, and may be connected with a comfort mechanism, an automatic locking mechanism, or any other appropriate mechanism known in the art. The spool 16 also has a pair of ratchet wheels 56, one of which is shown in FIGS. 2–5. Each of the ratchet wheels 56 has ratchet teeth 58 and is fixed to the shaft 46 to rotate about the axis 48 with the shaft 46.

The retractor 14 further includes an emergency locking mechanism 60. The emergency locking mechanism 60 is actuated upon the occurrence of a vehicle collision and, when actuated, blocks unwinding rotation of the spool 16. The emergency locking mechanism 60 thus blocks extraction of the webbing 12 from the retractor 14 so that the webbing 12 will restrain an occupant of the seat 28 (FIG. 1) during a vehicle collision.

Figure 2:
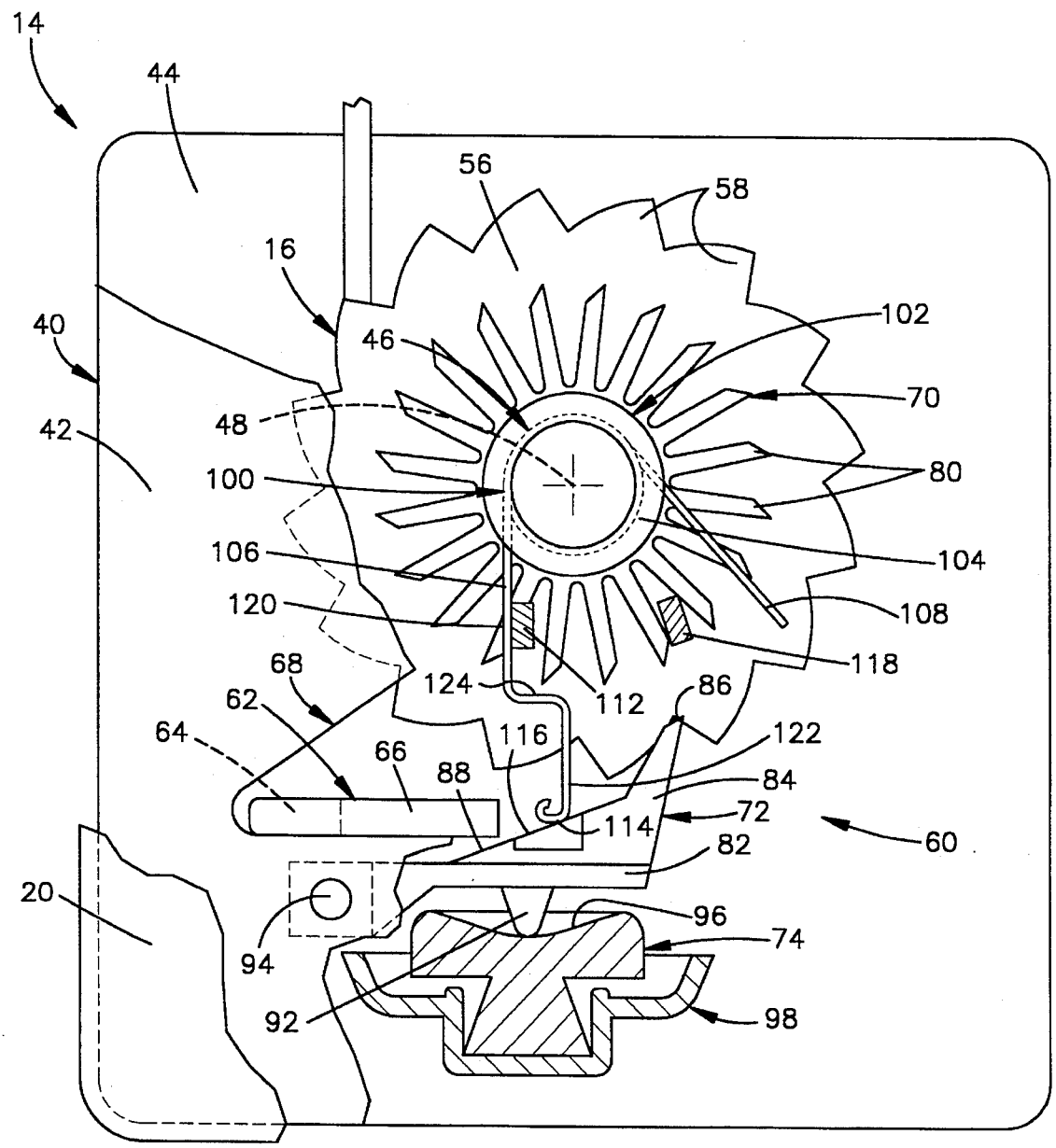
FIG. 2 is a view of parts of the apparatus of FIG. 1.
Figure 4:
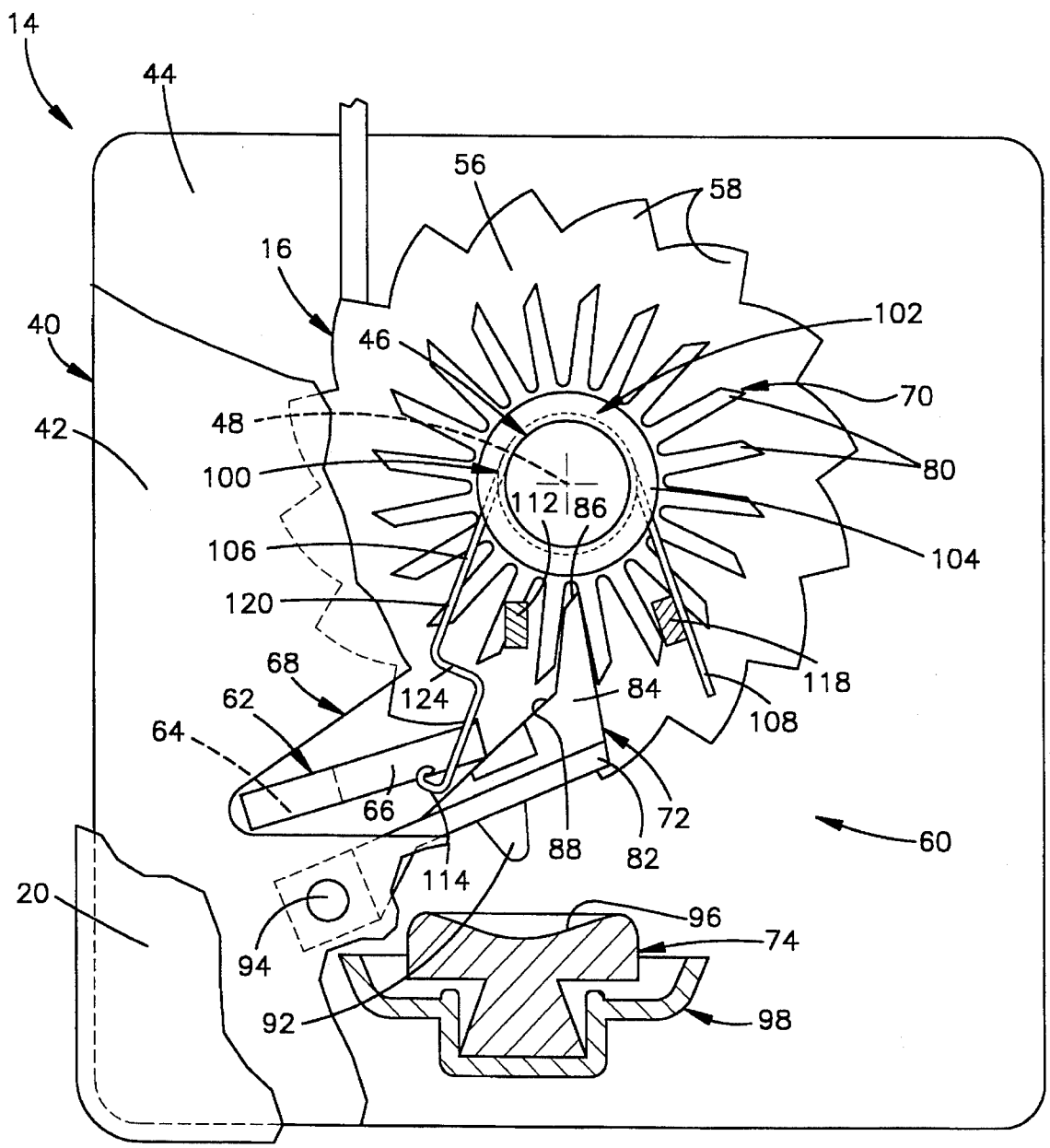

The emergency locking mechanism 60 includes a ratchet pawl 62. The ratchet pawl 62 has a central portion 64 and opposite end portions 66, one of which is shown in the drawings. The central portion 64 extends across the frame 40 between the side walls 42 and 44. Each of the opposite end portions 66 extends outward through a respective one of a pair of aligned openings 68 in the side walls 42 and 44, one of which is shown partially in the drawings. The ratchet pawl 62 is thus supported on the frame 40 for pivotal movement between a non-locking position and a locking position. When the ratchet pawl 62 is in the non-locking position, as shown in FIG. 2, the opposite end portions 66 of the ratchet pawl 62 are spaced from the ratchet teeth 58 on the spool 16. When the ratchet pawl 62 is in the locking position, as shown in FIG. 4, the opposite end portions 66 extend into the path of movement of the ratchet teeth 58 to block rotation of the spool 16 in the unwinding direction.

The emergency locking mechanism 60 further includes parts that cooperate with the spool 16 and the ratchet pawl 62 to move the ratchet pawl 62 to the locking position upon the occurrence of a vehicle collision. Such parts of the emergency locking mechanism 60 include a pilot gear 70, a pilot pawl 72, and an inertia weight 74.

The pilot gear 70 has radially elongated gear teeth 80, and is supported on the shaft 46. Specifically, the pilot gear 70 is fixed to the shaft 46 at a location between the first side wall 42 of the frame 40 and the adjacent ratchet wheel 56 on the spool 16. The pilot gear 70 is thus supported on the shaft 46 to rotate about the axis 48 with the spool 16 in the winding and unwinding directions.

The pilot pawl 72 has a horizontally elongated base portion 82. A vertically elongated arm portion 84 of the pilot pawl 72 projects upward from the base portion 82, and has an upper end 86 adjacent to the gear teeth 80 on the pilot gear 70. An inclined actuator surface 88 on the arm portion 84 faces the adjacent end portion 66 of the ratchet pawl 62.

The pilot pawl 72 also includes a knob 92 and a hub 94. The knob 92 projects downward from the base portion 82 and rests on the inertia weight 74. The hub 94 projects horizontally from one end of the base portion 82, and is received in an opening in the first side wall 42 of the frame 40. The hub 94 supports the pilot pawl 72 for pivotal movement relative to the frame 40 between an unactuated position, as shown in FIG. 2, and an actuated position, as shown in FIG. 4. When the pilot pawl 72 is in the unactuated position, the actuator surface 88 on the pilot pawl 72 is spaced slightly from the adjacent end portion 66 of the ratchet pawl 62. When the pilot pawl 72 is moved from the unactuated position to the actuated position, the actuator surface 88 moves against the adjacent end portion 66 of the ratchet pawl 62 and pivots the ratchet pawl 62 from the non-locking position to the locking position.

Figure 3:
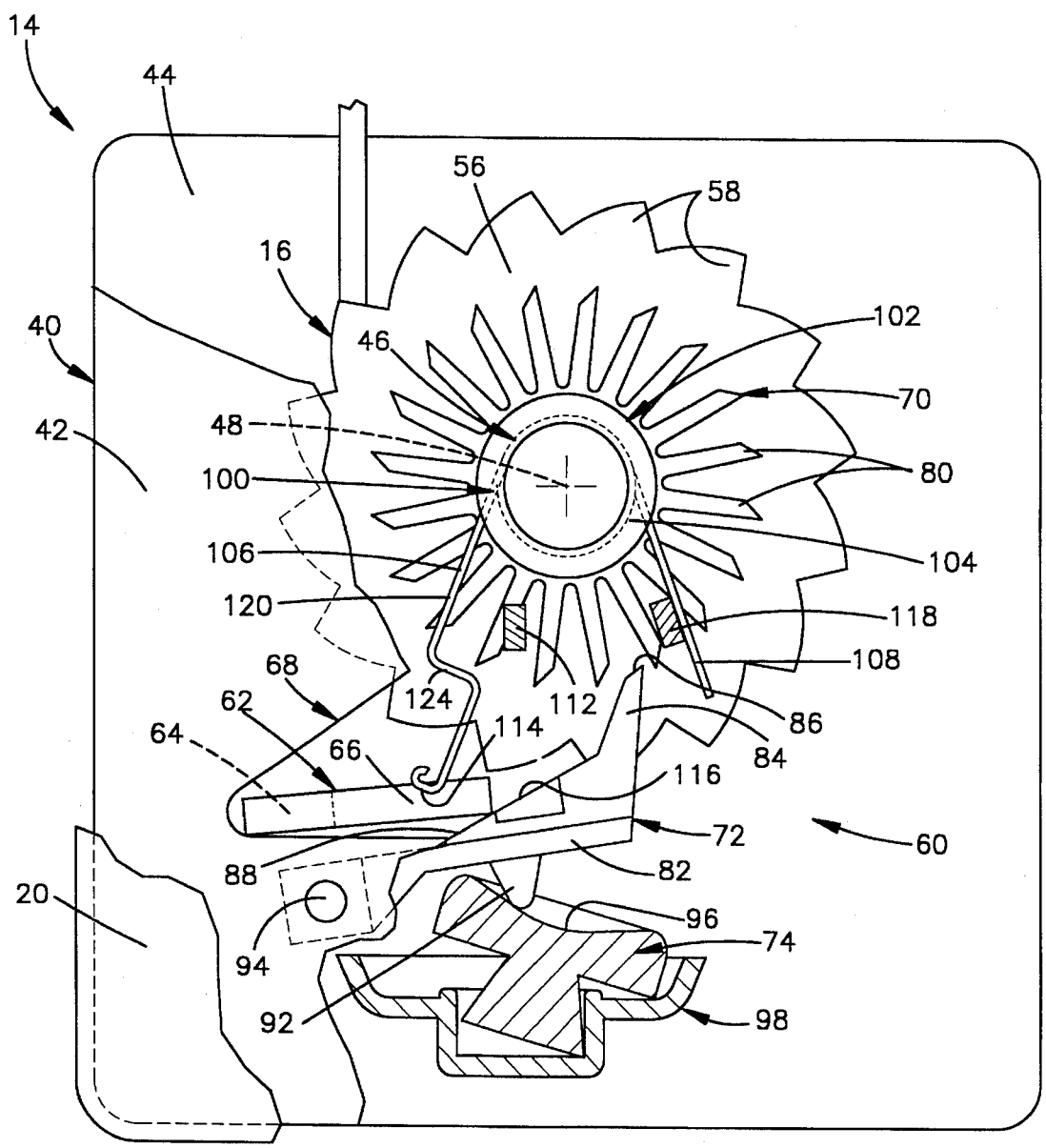
FIGS. 3, 4, and 5 are views showing the parts of FIG. 2 in different positions.

The inertia weight 74 has a conical upper surface 96 upon which the knob 92 on the pilot pawl 72 rests. The inertia weight 74, in turn, rests on a support member 98 which is mounted on the first side wall 42 of the frame 40 in a known manner. When the vehicle experiences sudden deceleration, the inertia weight 74 tends to tilt from the rest position in which it is shown in FIG. 2. The conical upper surface 96 of the inertia weight 74 then applies an inertial force to the knob 92 which urges the pilot pawl 72 to move pivotally upward from the unactuated position of FIG. 2. When the vehicle experiences a predetermined amount of deceleration which indicates the occurrence of a vehicle collision, the inertia weight 74 tilts from the rest position of FIG. 2 to a collision-indicating position, such as the collision-indication position in which it is shown in FIG. 3. The inertia weight 74 then applies a predetermined inertial force to the knob 92 which is sufficient to move the pilot pawl 72 pivotally upward from the unactuated position of FIG. 2 to an intermediate position, as shown in FIG. 3.

When the pilot pawl 72 is in the intermediate position of FIG. 3, the arm portion 84 of the pilot pawl 72 extends into the path of movement of the gear teeth 80 on the pilot gear 70. A slight amount of unwinding (clockwise) rotation of the spool 16 then causes the gear teeth 80 on the pilot gear 70 to move against the arm portion 84, and thereby to move the pilot pawl 72 pivotally from the intermediate position of FIG. 3 to the actuated position of FIG. 4. Such unwinding rotation of the spool 16 occurs when the vehicle occupant moves forcefully against the webbing 12 as a result of the sudden vehicle deceleration that is caused by the vehicle collision. As described briefly above, the pilot pawl 72 moves the ratchet pawl 62 to the locking position when the pilot pawl 72 is moved to the actuated position. The emergency locking mechanism 60 thus operates to block further extraction of the webbing 12 so that the webbing 12 will restrain an occupant of the seat 28 (FIG. 1) during a vehicle collision.

As thus far described, the retractor 14, including the foregoing parts of the emergency locking mechanism 60, is substantially similar to the retractor disclosed in U.S. Pat. No. 4,632,331, assigned to TRW Canada Limited. Accordingly, the emergency locking mechanism 60, as thus far described, is an example of known emergency locking mechanisms that respond to movement of a collision indicator, such as an inertia member, to a collision-indicating position. Other emergency locking mechanisms of this type could be used as alternatives. However, it is known that such an emergency locking mechanism can generate an undesirable noise if the collision indicator and/or associated parts of the retractor are permitted to vibrate or rattle under the influence of forces imparted to the retractor by the moving vehicle. Therefore, a seat belt retractor which is constructed in accordance with the present invention further includes a mechanism which suppresses noise by suppressing vibration and rattling of such parts of the retractor. In the preferred embodiment of the present invention shown in the drawings, that mechanism includes a spring 100 and a clutch 102.

The spring 100 is a metal wire having a coiled portion 104 and first and second spring arms 106 and 108 which extend radially from the coiled portion 104. The clutch is a small spool which is received coaxially over the shaft 46 on the spool 16, and is fixed to the shaft 46 to rotate about the axis 48 with the spool 16. The coiled portion 104 of the spring 100 is wrapped around the clutch 102 and is biased to constrict radially against the clutch 102. The spring 100 is thus supported for rotation with the clutch 102 and the spool 16 between a blocking position, as shown in FIG. 2, and a non-blocking position, as shown in FIG. 3.

When the spring 100 is in the blocking position, the first spring arm 106 abuts a first stop member 112 on the adjacent side wall 42 of the frame 40. Additionally, a terminal end portion 114 of the first spring arm 106 abuts a tab 116 on the pilot pawl 72. The spring 100 thus engages the pilot pawl 72 so as to resist pivotal movement of the pilot pawl 72 upward from the unactuated position of FIG. 2. If the spool 16 rotates from the position of FIG. 2 in the unwinding (clockwise) direction, the spring 100 will rotate with the clutch 102 in the clockwise direction until the second spring arm 108 moves against a second stop member 118 on the adjacent side wall 42 of the frame 40, as shown in FIG. 3. The spring 100 is thus moved from the blocking position to the non-blocking position upon unwinding rotation of the spool 16. The spring 100 will remain in the non-blocking position throughout continued unwinding rotation of the spool 16 because the clutch 102 on the shaft 46 can then rotate in the clockwise direction in sliding contact with the coiled portion 104 of the spring 100. Preferably, such clockwise rotation of the clutch 102 causes the coiled portion 104 of the spring 100 to unwind slightly, and thereby to loosen its grip on the clutch 102, so that the spring 100 will not impede unwinding rotation of the spool 16.

If the spool 16 rotates from the position of FIG. 3 in the winding (counterclockwise) direction, the spring 100 will rotate with the clutch 102 in the counterclockwise direction until the first spring arm 106 moves back into contact with the first stop member 112 on the side wall 42. The spring 100 will remain in the blocking position throughout continued winding rotation of the spool 16 as the clutch 102 on the shaft 46 rotates in the counterclockwise direction in sliding contact with the coiled portion 104 of the spring 100. The coiled portion 104 of the spring 100 preferably unwinds slightly in response to such counterclockwise rotation of the clutch 102 so as not to impede winding rotation of the spool 16.

The retractor 14 has the condition shown in FIG. 2 when the webbing 12 is in the fully retracted position shown in dashed lines in FIG. 1. As a vehicle occupant extracts the webbing 12 from the retractor 14, the spool 16 rotates in the unwinding direction, which is clockwise as viewed in FIG. 2, and thus moves the spring 100 in the clockwise direction from the blocking position of FIG. 2 to the non-blocking position of FIG. 3. After the webbing 12 has been moved to an extracted position, such as the fully extracted position shown in solid lines in FIG. 1, the vehicle occupant may allow the webbing 12 to be retracted as necessary to enable the tongue 24 to be locked in the buckle 30 and/or to take up slack in the webbing 12 when the tongue 24 has been locked in the buckle 30. The spool 16 then rotates in the winding (counterclockwise) direction, and moves the spring 100 back in the counterclockwise direction from the non-blocking position of FIG. 3 to the blocking position of FIG. 2. Therefore, the spring 100 is normally located in the blocking position when the webbing 12 is fastened about an occupant of the seat 28 by the tongue 24 and the buckle 30.

As described above, the vehicle occupant moves forcefully against the webbing 12 during a vehicle collision. This causes a slight additional extraction of the webbing 12 from the retractor 14. The spool 16 then rotates in the unwinding (clockwise) direction, and moves the spring 100 in the clockwise direction from the blocking position of FIG. 2 to the non-blocking position of FIG. 3. The terminal end portion 114 of the first spring arm 106 is thus moved to a location spaced from the tab 116 on the pilot pawl 72. The pilot pawl 72 is then released to be moved pivotally upward from the unactuated position of FIG. 2 to the actuated position of FIG. 4 by the inertia weight 74 and the pilot gear 70.

As noted above, the spring 100 resists upward movement of the pilot pawl 72 when the spring 100 is in the blocking position. The spring 100 thus suppresses vibrations and rattling movements which can be caused by forces imparted to the inertia weight 74 and the pilot pawl 72 by the moving vehicle. As a result, noises that might otherwise be caused by such vibrations and/or rattling movements are suppressed by the spring 100.

Figure 5:
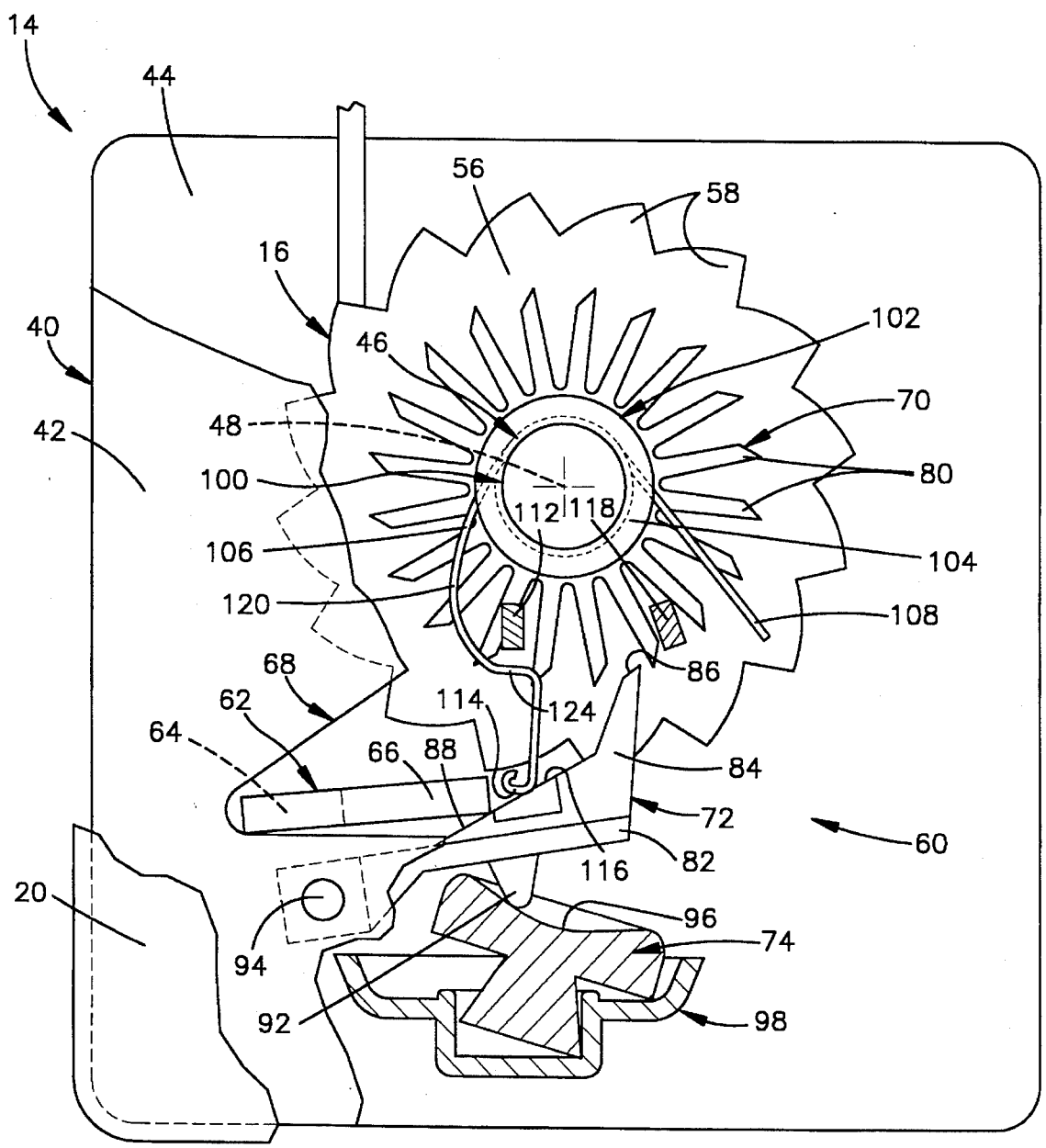

More specifically, the stiffness of the first spring arm 106 is predetermined with reference to the mass of the inertia weight 74 so that the first spring arm 106 will resist bending to any substantial degree under the influence of a force that is transmitted from the inertia weight 74 if the magnitude of such a force is less than a predetermined threshold value. If the magnitude of such a force is equal to or greater than the predetermined threshold value, the first spring arm 106 will bend, as shown in FIG. 5, to permit the pilot pawl 72 to move upward from the unactuated position to the intermediate position. The predetermined threshold value corresponds with the value of the inertial force that is required to tilt the inertia weight 74 from the rest position to a collision-indicating position. The predetermined threshold value thus corresponds with the value of the inertial force that is applied to the pilot pawl 72 by the inertia weight 74 upon the occurrence of vehicle deceleration indicative of a collision. This is a fail-safe feature of the retractor 14 which ensures that the spring 100 will not block movement of the pilot pawl 72 if the spring 100 is located in the blocking position upon the occurrence of a collision.

In addition to having a predetermined stiffness, the first spring arm 106 also has a configuration which is designed specifically to promote bending in the foregoing manner. As shown in the drawings, first spring arm 106 has an upper end portion 120 which extends radially from the coiled portion 104, and has a lower end portion 122 which includes the terminal end portion 114. The upper and lower end portions 120 and 122 are parallel to each other. The first spring arm 106 further has an intermediate portion 124 which joins the upper and lower end portions 120 and 122 to each other. The intermediate portion 124 is perpendicular to the upper and lower end portions 120 and 122. As a result of this configuration, a force that is applied to the first spring arm 106 from the tab 116 on the pilot pawl 72 is transmitted longitudinally through the lower end portion 122 to the intermediate portion 124. The intermediate portion 124 transmits the force from the lower end portion 122 to the upper end portion 120. Since the intermediate portion 124 is perpendicular to the upper and lower end portions 120 and 122, it defines a moment arm which applies the force to the upper end portion 120 almost entirely as a bending force. The bending force causes the upper end portion 120 to bend between the coiled portion 104 and the intermediate portion 124, as shown in FIG. 5, when the force applied to the spring 100 equals or exceeds the predetermined threshold value.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a spool supported for winding and unwinding rotation;

locking means for blocking unwinding rotation of said spool when said locking means is actuated, said locking means including a movable locking member and being actuated upon movement of said locking member from a first position to a second position;

said locking means further including collision indicator means for applying a predetermined force to said locking member to move said locking member from said first position toward said second position in response to a predetermined condition indicative of a vehicle collision; and means for suppressing noise, said means for suppressing noise including a movable spring having a blocking position in which said spring suppresses noise by resisting movement of said locking member from said first position toward said second position, said spring being movable into and out of said blocking position in response to rotation of said spool;

said spring being deflectable under the influence of said predetermined force to permit said collision indicator means to move said locking member from said first position toward said second position in response to said predetermined condition when said spring is in said blocking position;

said spring having a first portion, a second portion, and means for defining a moment arm which transmits said predetermined force from said first portion to said second portion to bend said second portion under the influence of said predetermined force.

2. Apparatus as defined in claim 1 wherein said first and second portions of said spring are parallel to each other, said means for defining a moment arm including a third portion of said spring which is perpendicular to said first and second portions.

3. Apparatus as defined in claim 2 wherein said spring comprises a metal wire which includes said first, second and third portions of said spring.

4. Apparatus comprising:

a spool supported for winding and unwinding rotation;

locking means for blocking unwinding rotation of said spool when said locking means is actuated, said locking means including a movable locking member and being actuated upon movement of said locking member from a first position to a second position;

said locking means further including collision indicator means for applying a predetermined force to said locking member to move said locking member from said first position toward said second position in response to a predetermined condition indicative of a vehicle collision; and means for suppressing noise, said means for suppressing noise including a movable spring having a blocking position in which said spring suppresses noise by resisting movement of said locking member from said first position toward said second position, said spring being movable into and out of said blocking position in response to rotation of said spool;

said spring being deflectable under the influence of said predetermined force to permit said collision indicator means to move said locking member from said first position toward said second position in response to said predetermined condition when said spring is in said blocking position;

said spring having a portion that contacts said locking member to resist movement of said locking member when said spring is in said blocking position, said portion of said spring being spaced from said locking member when said spring is out of said blocking position.

5. Apparatus as defined in claim 4 wherein said predetermined condition comprises a predetermined amount of vehicle deceleration, said collision indicator means comprising an inertia weight which applies said predetermined force directly to said locking member in response to said predetermined amount of vehicle deceleration.

6. Apparatus as defined in claim 4 wherein said locking means includes a ratchet pawl having a locking position in which said ratchet pawl contacts ratchet teeth on said spool to block unwinding rotation of said spool, said locking member comprising a pilot pawl which moves said ratchet pawl to said locking position upon movement of said pilot pawl to said second position.

7. Apparatus as defined in claim 6 wherein said predetermined condition comprises a predetermined amount of vehicle deceleration, said collision indicator means including an inertia weight which moves said pilot pawl from said first position to an intermediate position in response to said predetermined amount of vehicle deceleration, said locking means further including a pilot gear which moves said pilot pawl from said intermediate position to said second position.

8. Apparatus comprising:

a spool supported for winding and unwinding rotation about an axis;

locking means for blocking unwinding rotation of said spool when said locking means is actuated, said locking means including a movable locking member and being actuated upon movement of said locking member from a first position to a second position;

said locking means further including collision indicator means for applying a predetermined force to said locking member to move said locking member from said first position toward said second position in response to a predetermined condition indicative of a vehicle collision; and means for suppressing noise, said means for suppressing noise including a spring supported for movement about said axis, said spring having a blocking position in which said spring suppresses noise by resisting movement of said locking member from said first position toward said second position, said spring being movable into and out of said blocking position in response to rotation of said spool;

said spring being deflectable under the influence of said predetermined force to permit said collision indicator means to move said locking member from said first position toward said second position in response to said predetermined condition when said spring is in said blocking position.

9. Apparatus as defined in claim 8 wherein said spring has a first portion, a second portion, and means for defining a moment arm which transmits said predetermined force from said first portion to said second portion to bend said second portion under the influence of said predetermined force.

10. Apparatus as defined in claim 9 wherein said first and second portions of said spring are parallel to each other, said means for defining a moment arm including a third portion of said spring which is perpendicular to said first and second portions.

11. Apparatus as defined in claim 10 wherein said spring comprises a metal wire which includes said first, second and third portions of said spring.

12. Apparatus as defined in claim 8 wherein said predetermined condition comprises a predetermined amount of vehicle deceleration, said collision indicator means comprising an inertia weight which applies said predetermined force directly to said locking member in response to said predetermined amount of vehicle deceleration.

13. Apparatus as defined in claim 8 wherein said spring has a portion that contacts said locking member to resist movement of said locking member when said spring is in said blocking position, said portion of said spring being spaced from said locking member when said spring is out of said blocking position.

14. Apparatus as defined in claim 8 wherein said locking means includes a ratchet pawl having a locking position in which said ratchet pawl contacts ratchet teeth on said spool to block unwinding rotation of said spool, said locking member comprising a pilot pawl which moves said ratchet pawl to said locking position upon movement of said pilot pawl to said second position.

15. Apparatus as defined in claim 14 wherein said predetermined condition comprises a predetermined amount of vehicle deceleration, said collision indicator means including an inertia weight which moves said pilot pawl from said first position to an intermediate position in response to said predetermined amount of vehicle deceleration, said locking means further including a pilot gear which moves said pilot pawl from said intermediate position to said second position.

* * * * *